(No Model.)

2 Sheets—Sheet 1.

J. B. DENNIS.
BANK REGISTER.

No. 375,609.  Patented Dec. 27, 1887.

Fig. 1.

WITNESSES

John B. Dennis
INVENTOR
By
                Attorney (No Model.) 2 Sheets—Sheet 2.

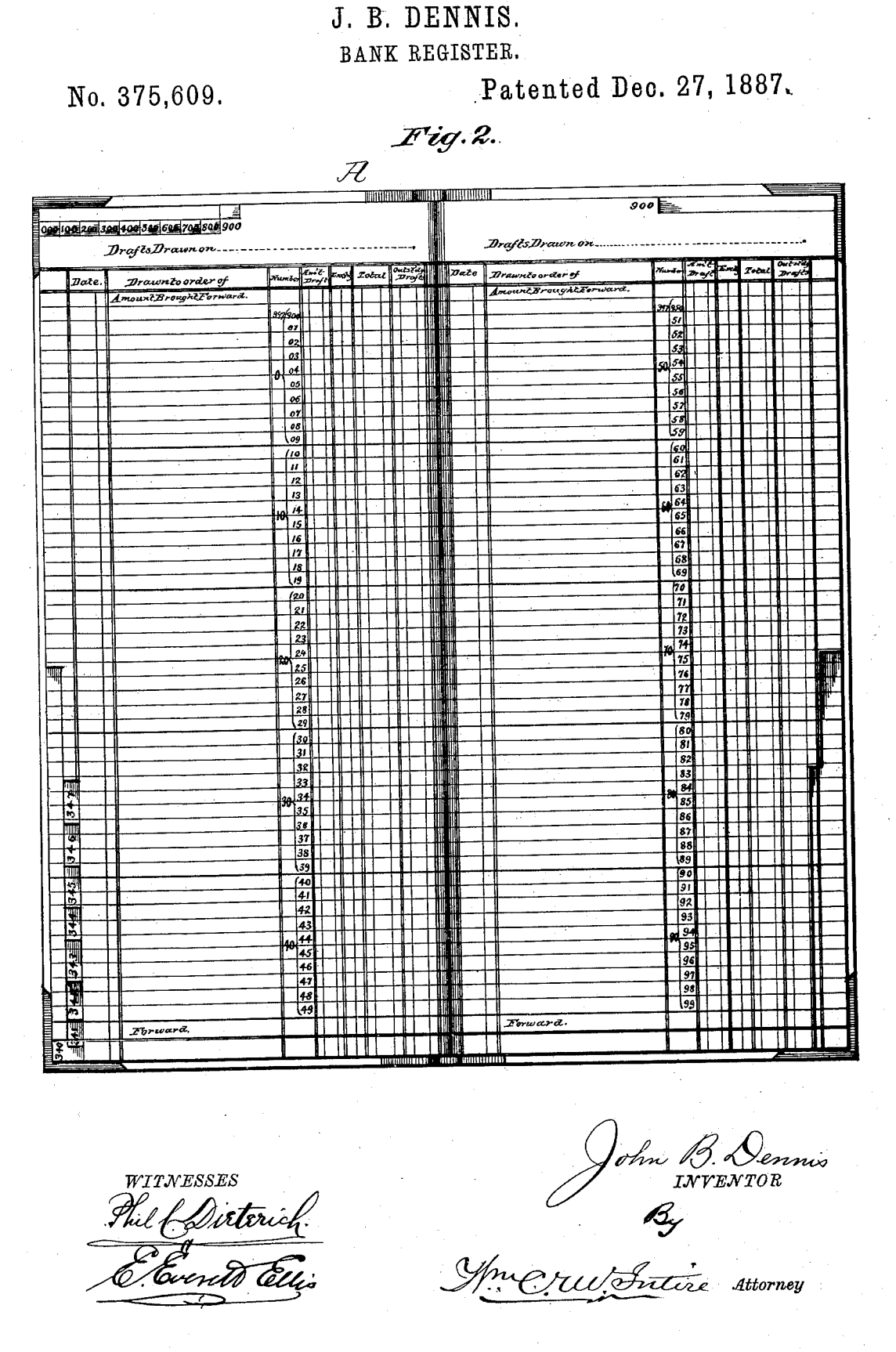

J. B. DENNIS.
BANK REGISTER.

No. 375,609. Patented Dec. 27, 1887.

*Fig. 2.*

United States Patent Office.

JOHN B. DENNIS, OF OTTUMWA, IOWA.

BANK-REGISTER.

SPECIFICATION forming part of Letters Patent No. 375,609, dated December 27, 1887.

Application filed July 18, 1887. Serial No. 244,627. (No model.)

*To all whom it may concern:*

Be it known that I, JOHN B. DENNIS, a citizen of the United States, residing at Ottumwa, Wapello county, Iowa, have invented new and useful Improvements in Bank-Registers, of which the following is a specification.

This invention relates to certain new and useful improvements in bank-registers; and it consists, substantially, in such features thereof as will hereinafter be more particularly described, and pointed out in the claims.

As illustrative of the purpose of my invention, I would state that at the first of each month it is customary for Eastern banks to send their Western corresponding banks a statement of all drafts paid by them during the month, and as the name of the party of the draft, as well as the number thereof, is put on the statement in the order that they are received by the Eastern bank, much turning and hunting is necessitated on the part of the Western banker, since the registers heretofore employed in checking off from the statements have been such as to lend no rapid facility in the finding and checking of each single draft.

The object of my invention is to enable the pages on which drafts are registered to be quickly found by the employment of index-numbers corresponding with those of the drafts, whereby any desired number may be at once found without previous reference, and whether the register be opened from one side or the other, all as will more fully appear hereinafter when taken in connection with the accompanying drawings, wherein—

Figure 1 is a view of my improved register, showing the same opened from one side; and Fig. 2 is a view thereof showing it as opened from the opposite side.

Reference being had to the drawings by the letters marked thereon, A represents my improved register, the same being shown as beginning with "340,000" and ending with "347,999," although it is evident that the pages of such register may be made to begin with any number desired. The numerals constituting the thousands of the whole numbers are arranged on each opposite page at the side edges, the set on one side being read from the top downward, while the set on the other side is read from the bottom upward, thus enabling the thousands of a number to be found from either side of the register. At the top or bottom (preferably the top) of the pages of the register are arranged in succession the numerals indicating the hundreds of the whole numbers, each double page containing a hundred numbers, there being fifty on a page. On each opposite page the hundreds are given, as shown, and it will be seen on opening the book to "340,000" the thousands of the number will appear on the opposite pages at the sides, while the hundreds will in like manner appear at the top. For each thousand numbers ten leaves are required, and these are cut out at the side edges from both top and bottom in the ordinary manner of cutting indexes, and the numerals indicating the several thousands are printed or stamped on the tabs formed by such cutting. The individual leaves of each set of thousands are cut in like manner and the numerals indicating the hundreds placed thereon on opposite sides. Thus by opening the register to the page beginning "340,000" each separate quantity of hundreds can be read across the top, whether the said register be opened from the back or front.

We will suppose that it is the wish to check off a draft drawn to the order, say, of John Smith, the number of which, say, is "341,740." All that is necessary to do is to first open the register to the page on which "341" is printed at the side edge and then turn to the page of the thousand having "700" indicated at the top. In this way the name will be quickly found, and which will be at the top of the left-hand page.

Having thus described my invention, what I claim, and desire to secure by Letters Patent, is—

1. A bank-register containing a hundred numbers on each double page, having each ten pages cut in index form at the sides, and numerals thereon indicating successively the thousands of the numbers, and also having the individual page of each set cut in like manner at the top or bottom and numerals thereon indicating in successive manner the hundreds of the numbers, substantially as described.

2. A bank-register containing a hundred numbers on each double page, having each ten pages cut in index form on the sides reversely at the front and back and numerals on the two sides indicating successively the thousands of the numbers, and also having the individual pages of each set cut reversely in like manner at the top or bottom and numerals on the two sides indicating in successive manner the hundreds of the numbers, as described.

In testimony whereof I have hereunto set my hand in the presence of two subscribing witnesses.

JOHN B. DENNIS.

Witnesses:
J. F. NEWELL,
D. J. STRYKER.